US012659249B2

(12) United States Patent
Gourlay et al.

(10) Patent No.: US 12,659,249 B2
(45) Date of Patent: Jun. 16, 2026

(54) RECORDING PACKET LOSS IN A NETWORK

(71) Applicant: Arista Networks, Inc., Santa Clara, CA (US)

(72) Inventors: Douglas Alan Gourlay, San Francisco, CA (US); Udayakumar Srinivasan, Santa Clara, CA (US); Fred Hsu, Santa Clara, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 884 days.

(21) Appl. No.: 17/590,759

(22) Filed: Feb. 1, 2022

(65) Prior Publication Data

US 2023/0063253 A1      Mar. 2, 2023

Related U.S. Application Data

(60) Provisional application No. 63/240,208, filed on Sep. 2, 2021.

(51) Int. Cl.
  *H04L 43/0829*      (2022.01)
  *H04L 43/062*      (2022.01)
(52) U.S. Cl.
  CPC ........ *H04L 43/0829* (2013.01); *H04L 43/062* (2013.01)
(58) Field of Classification Search
  CPC . H04L 47/32; H04L 43/0829; H04L 43/0835; H04L 43/04; H04L 43/062; H04L 41/0645
  See application file for complete search history.

(56) References Cited

U.S. PATENT DOCUMENTS

| | | | |
|---|---|---|---|
| 11,075,847 B1 | 7/2021 | Kwan et al. | |
| 2007/0088815 A1* | 4/2007 | Ma ...................... | H04L 61/5076 709/224 |
| 2010/0008245 A1* | 1/2010 | Viger ..................... | H04L 47/10 370/252 |
| 2014/0201354 A1* | 7/2014 | Matthews ............... | H04L 47/12 709/224 |

(Continued)

FOREIGN PATENT DOCUMENTS

EP      3484124 A1 *  5/2019  ........... H04L 69/324

OTHER PUBLICATIONS

International Search Report and Written Opinion issued by the European Patent Office as the International Searching Authority (EP/ISA) for PCT Application No. PCT/US2022/042802, mailed Apr. 11, 2023, 14 pages.

(Continued)

*Primary Examiner* — Huy D Vu
*Assistant Examiner* — Bao G Nguyen
(74) *Attorney, Agent, or Firm* — Sprinkle IP Law Group

(57) ABSTRACT

Packets in a network may be dropped from time to time. Although network devices are able to provide counters specifying the number of dropped packets, these network devices are unable to provide additional context about the dropped packets. However, users of a network wish to know more about dropped packets; such as why the packets were dropped. Therefore, methods for capturing and storing the dropped packets are provided. This way, users can analyze the dropped packets to determine why these packets were dropped.

20 Claims, 12 Drawing Sheets

100
System

(56) References Cited

U.S. PATENT DOCUMENTS

| | | | |
|---|---|---|---|
| 2014/0233382 A1 | 8/2014 | Matthews et al. | |
| 2017/0302409 A1* | 10/2017 | Sherlock | H04L 1/06 |
| 2021/0289391 A1* | 9/2021 | Paladugu | H04L 47/2491 |
| 2022/0014478 A1* | 1/2022 | Lee | H04L 47/781 |
| 2022/0045927 A1* | 2/2022 | Liu | H04L 43/062 |
| 2022/0322078 A1* | 10/2022 | Xu | H04W 76/15 |

OTHER PUBLICATIONS

International Preliminary Report on Patentability issued by the International Bureau for PCT Application No. PCT/US2022/042802, mailed Mar. 14, 2024, 11 pages.
Examination Report issued by the European Patent Office for European Patent Application No. 22809931.3, mailed Dec. 17, 2024, 6 pages.

* cited by examiner

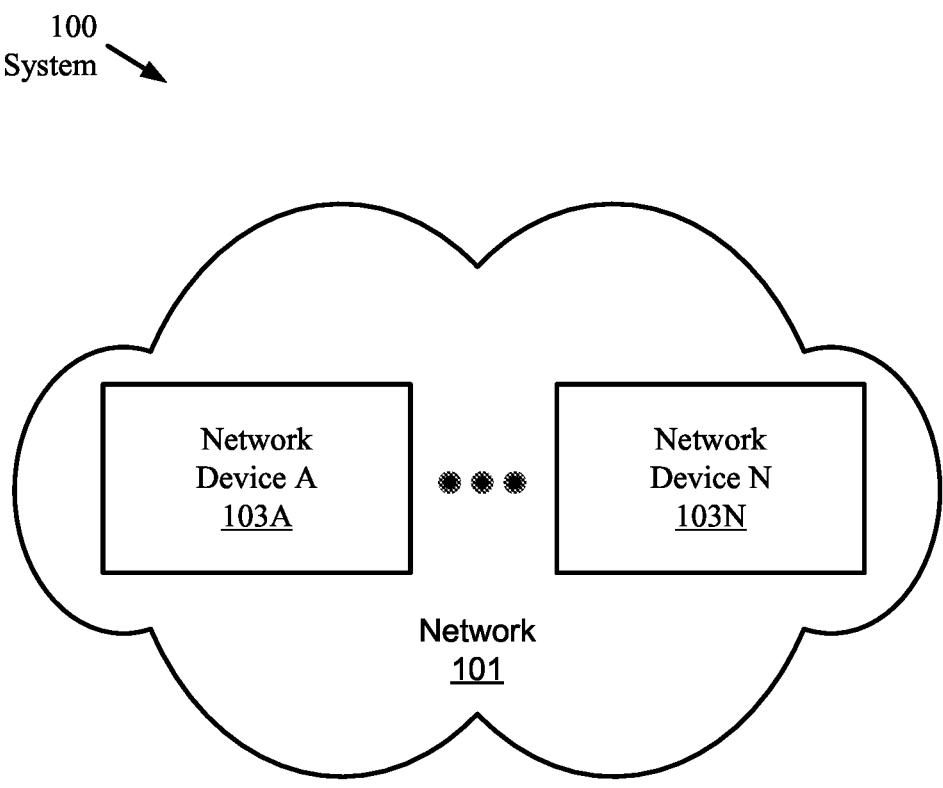
FIG. 1.1

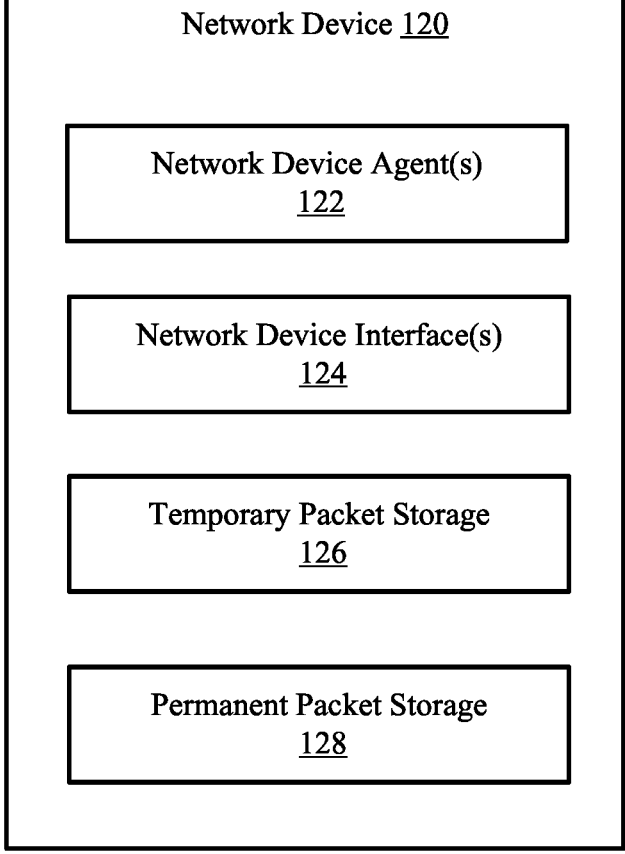
FIG. 1.2

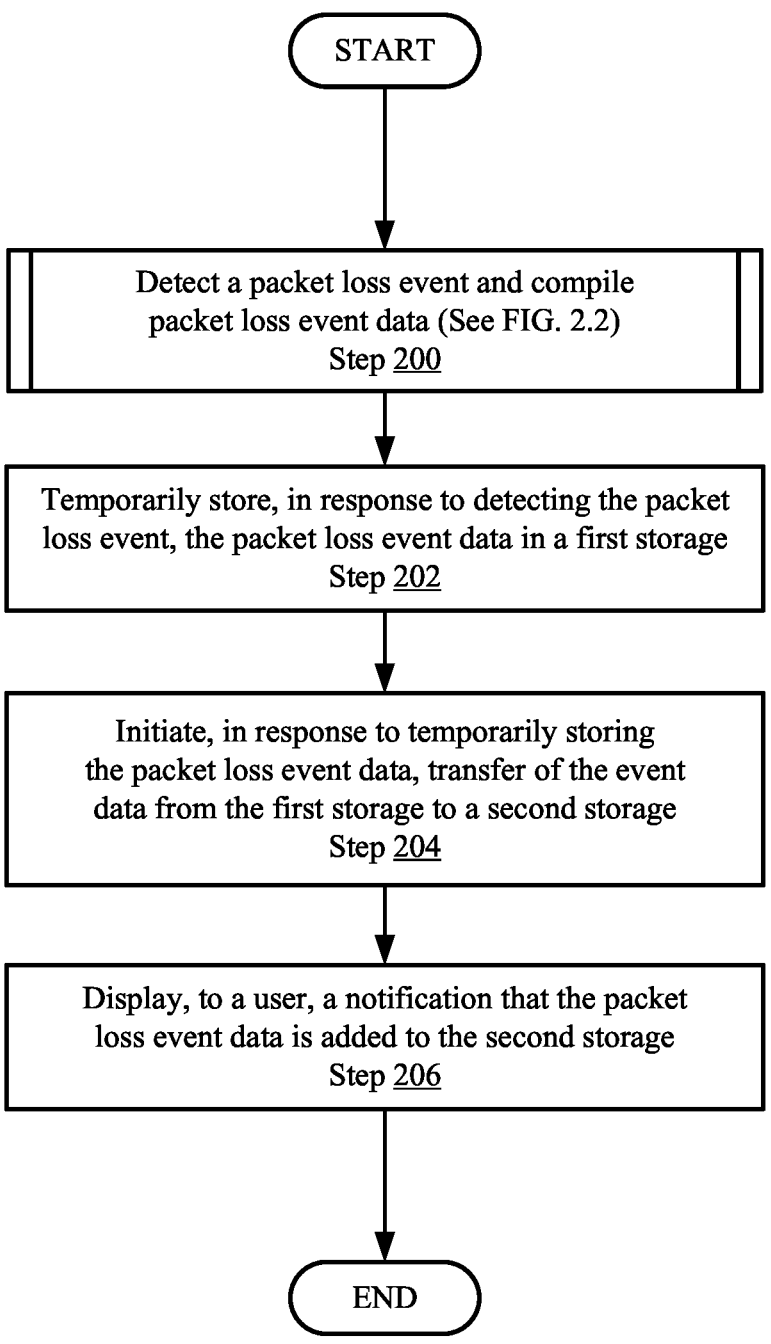
FIG. 2.1

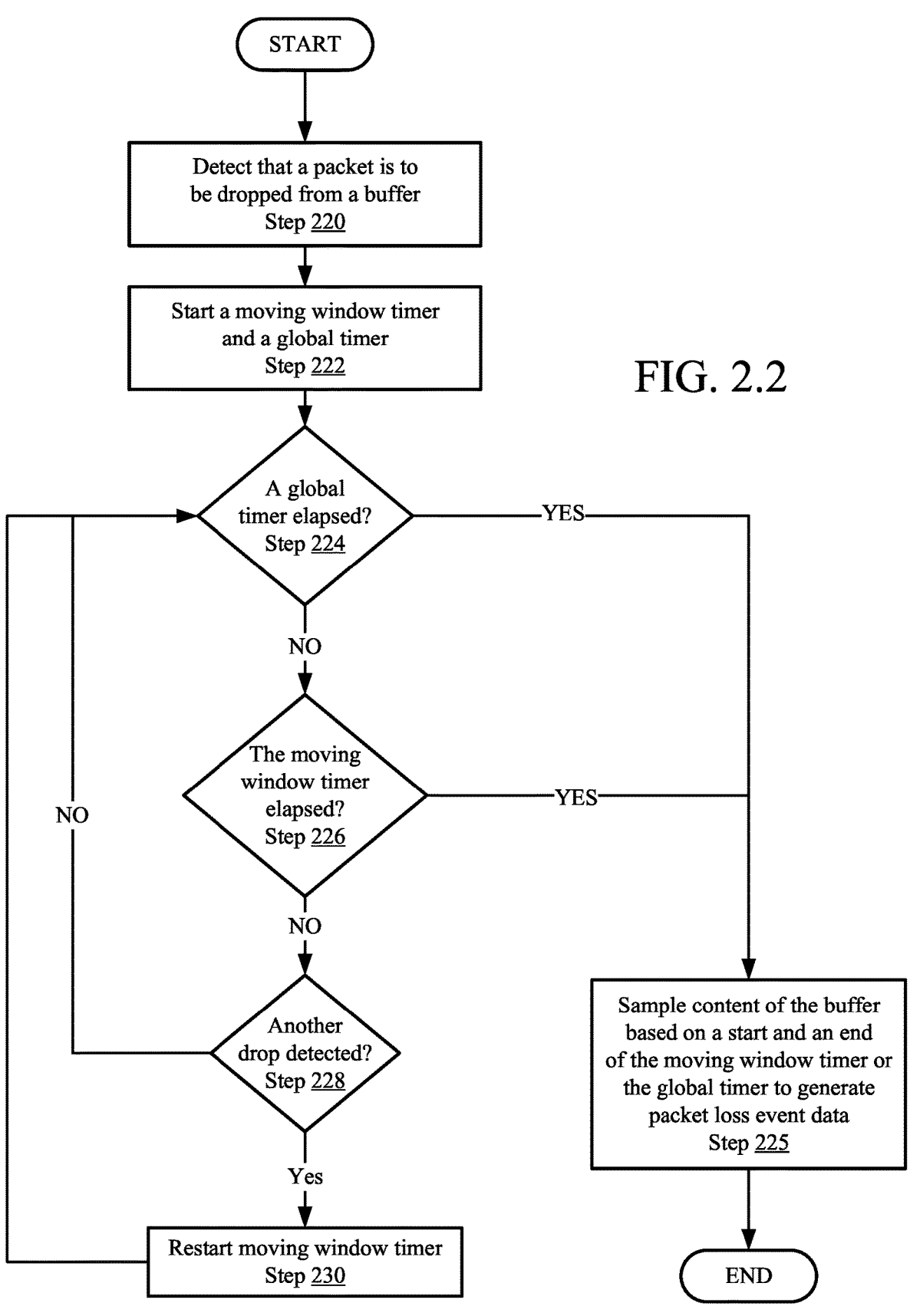
FIG. 2.2

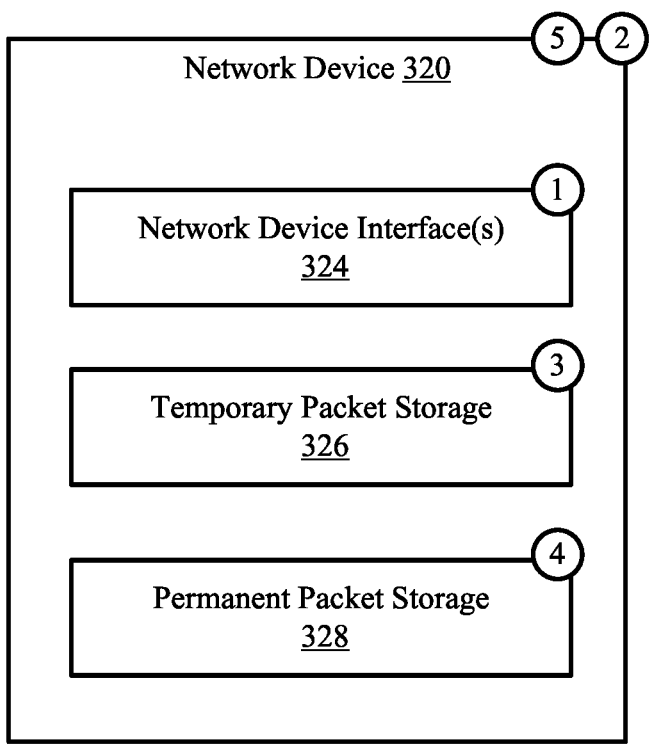
FIG. 3.1

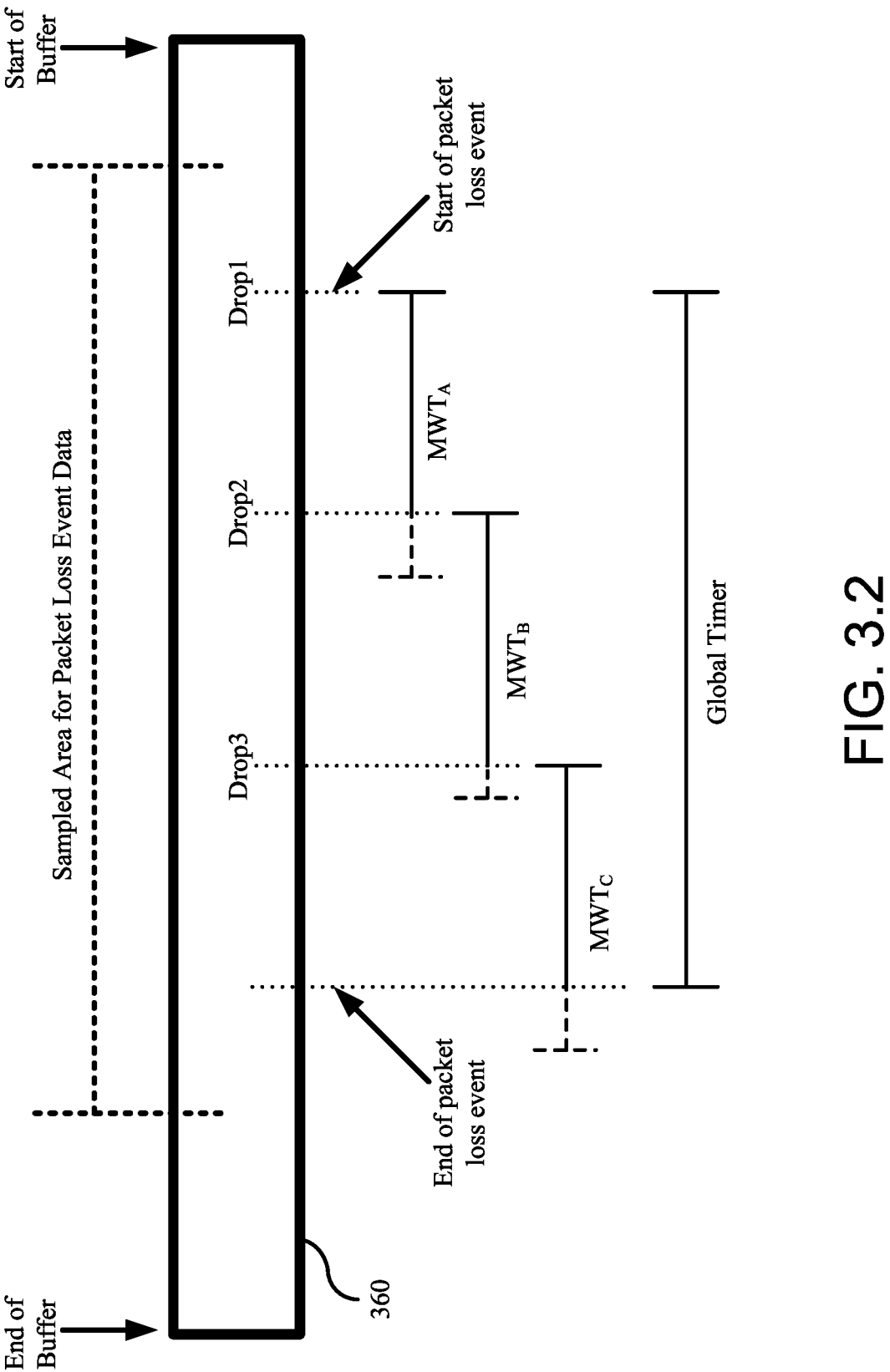
FIG. 3.2

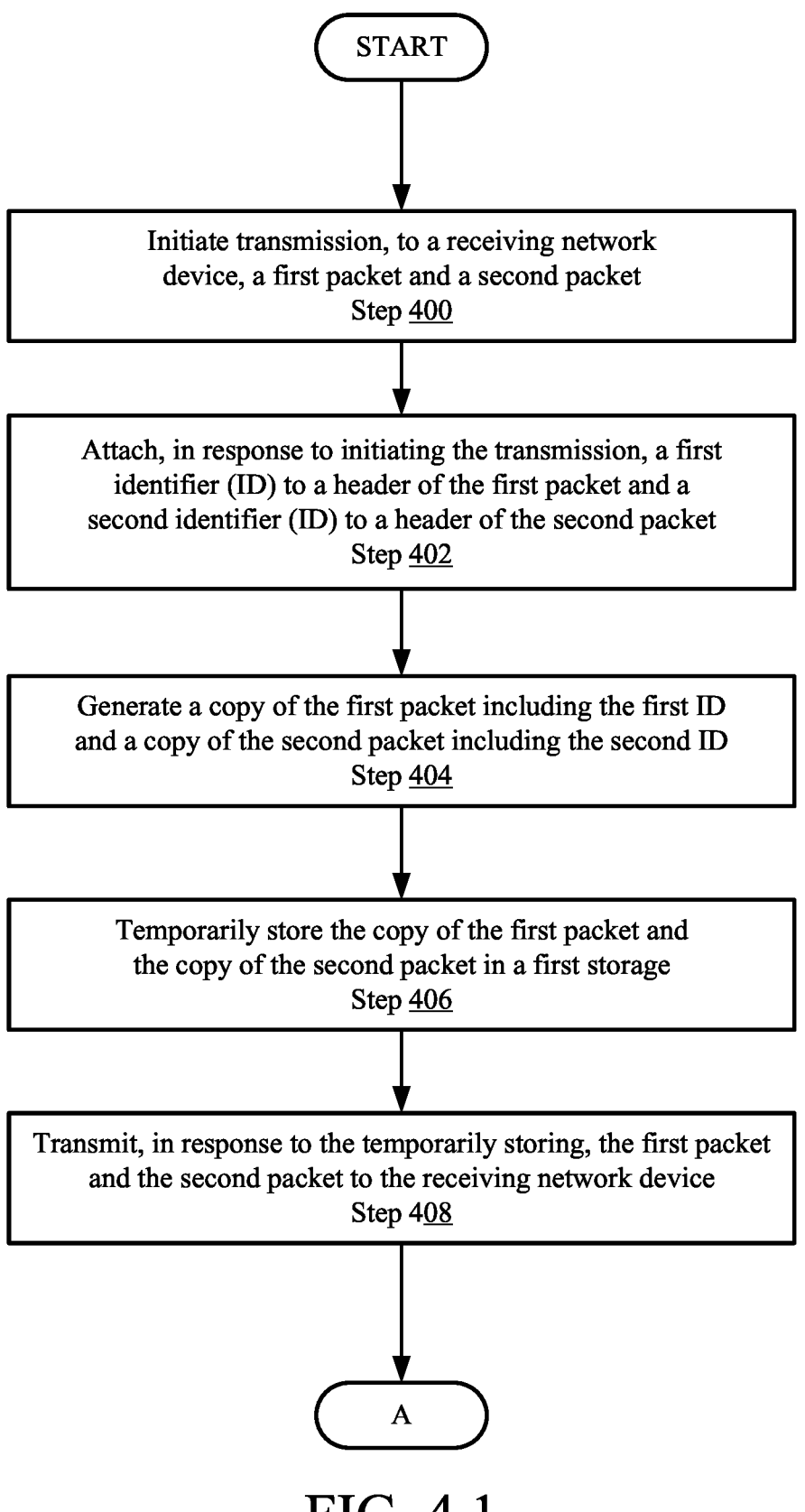
FIG. 4.1

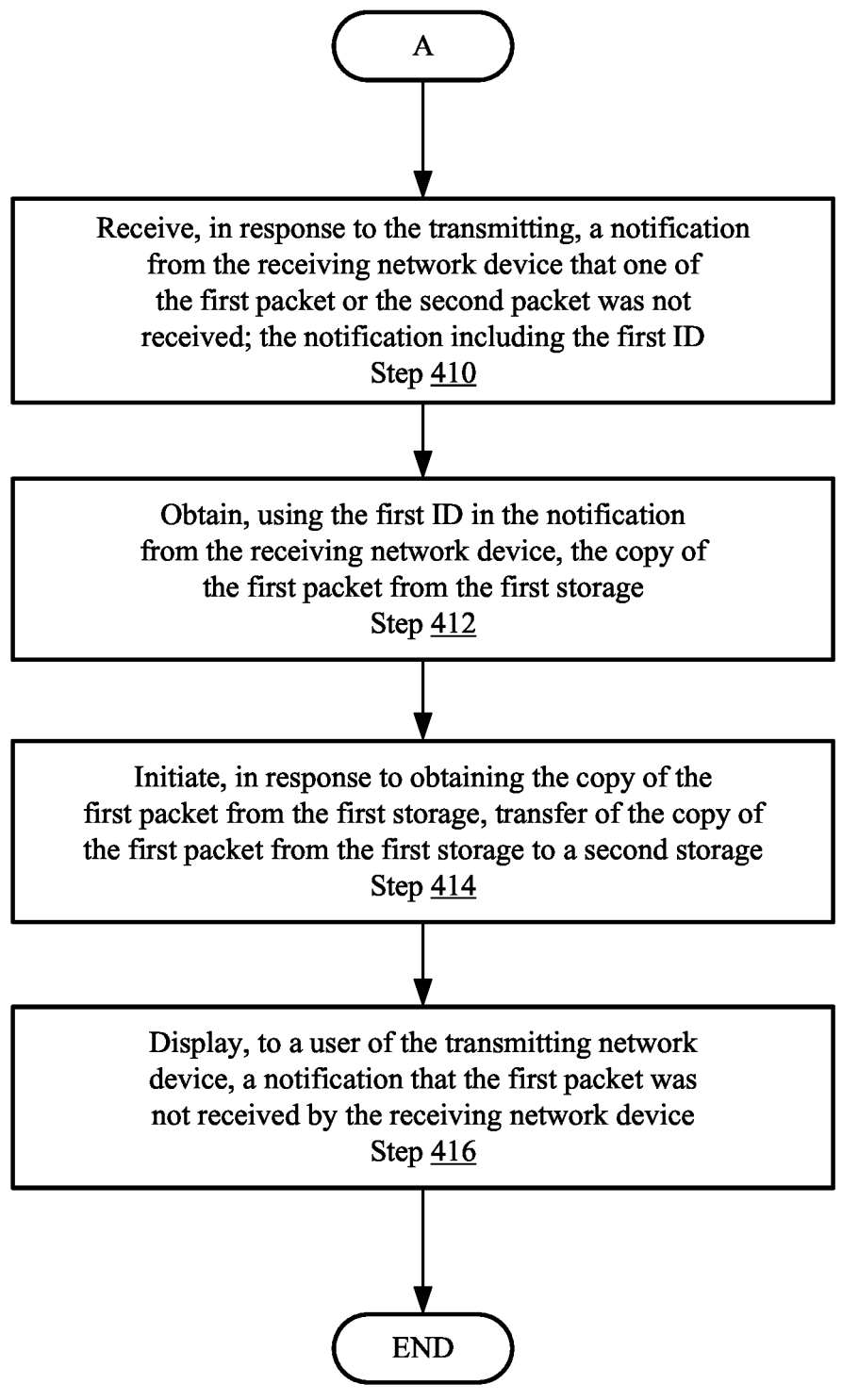
FIG. 4.2

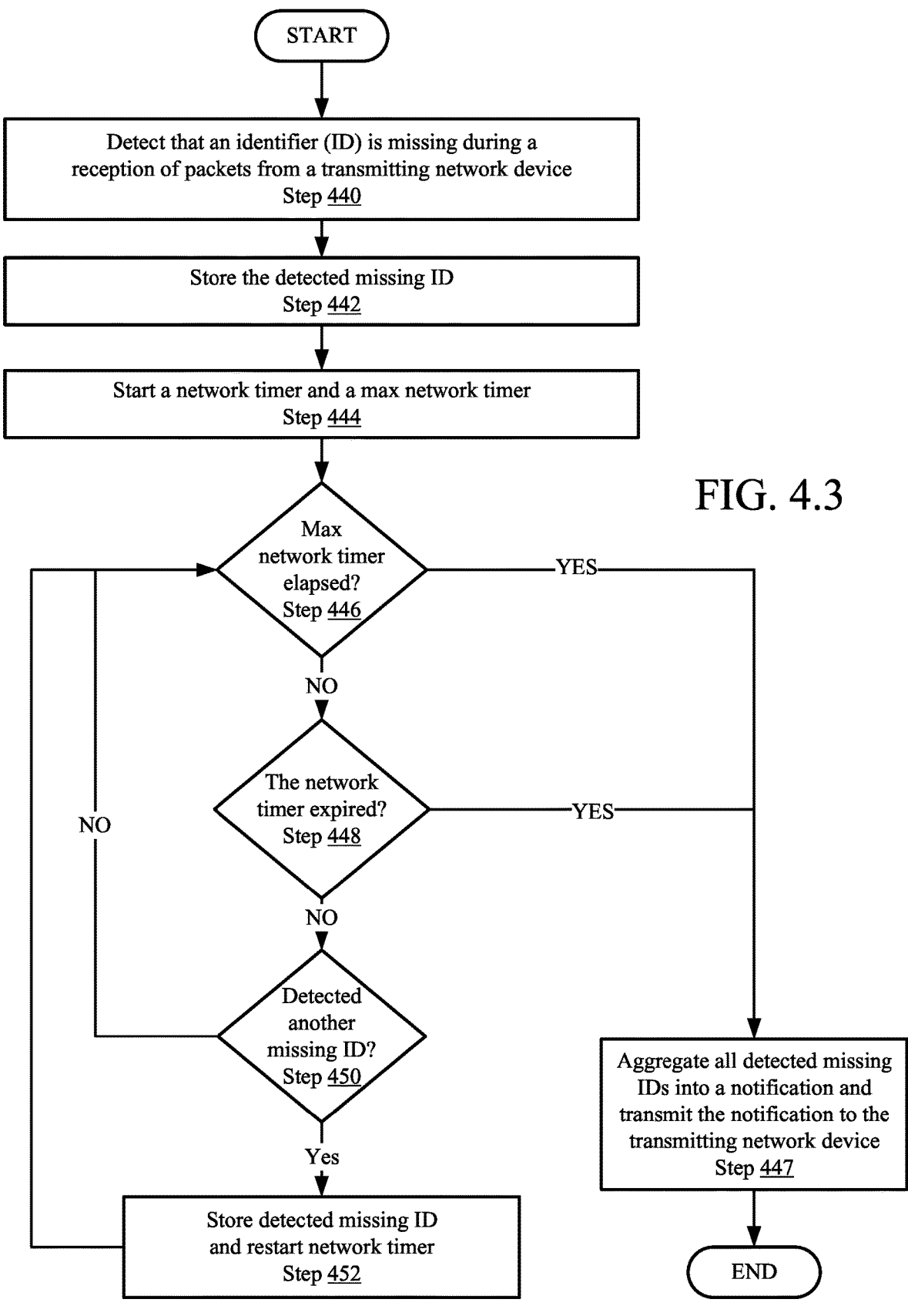
FIG. 4.3

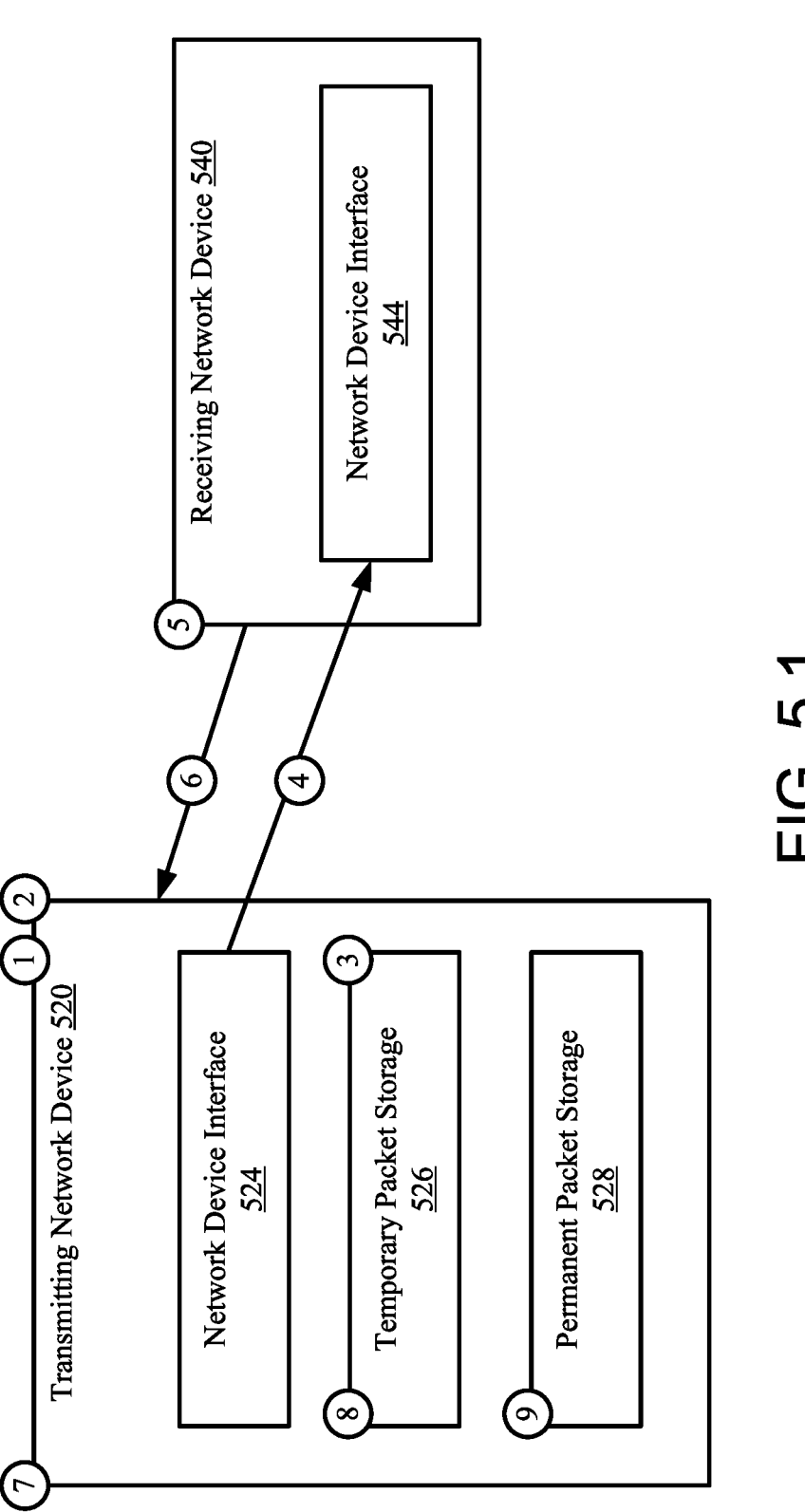
FIG. 5.1

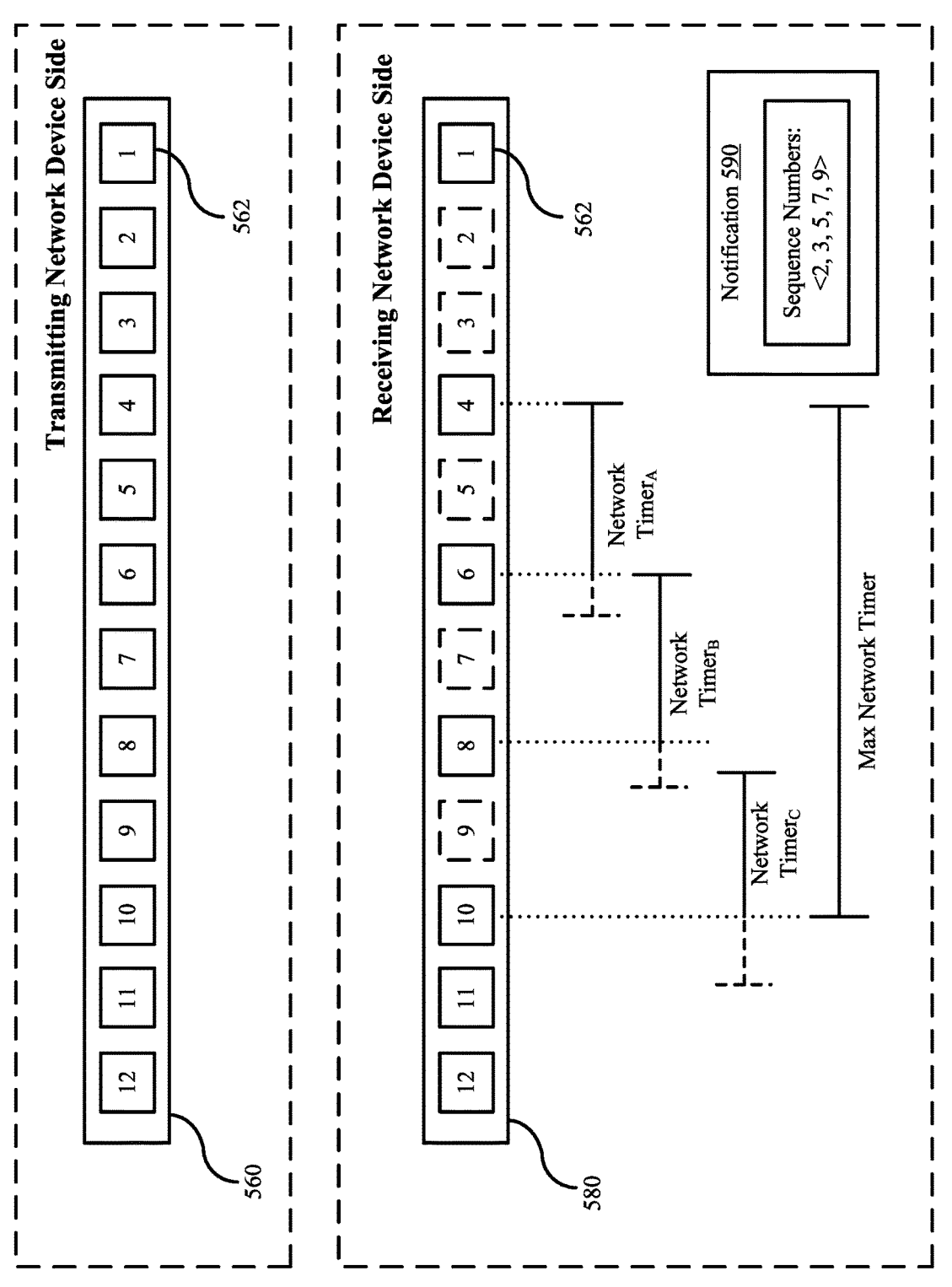
FIG. 5.2

RECORDING PACKET LOSS IN A NETWORK

CROSS-REFERENCE TO RELATED APPLICATIONS

This application claims priority to U.S. Provisional Patent Application No. 63/240,208 filed Sep. 2, 2021, the entire contents of which are incorporated herein by reference.

BACKGROUND

A communication system may enable devices to communicate with one another. The communication system may include devices that relay information (e.g., data packets) from a sending device to a destination device.

BRIEF DESCRIPTION OF DRAWINGS

Certain embodiments of the disclosure will be described with reference to the accompanying drawings. However, the accompanying drawings illustrate only certain aspects or implementations of the disclosure by way of example and are not meant to limit the scope of the claims.

FIG. 1.1 shows a system in accordance with one or more embodiments described herein.

FIG. 1.2 shows a diagram of a network device in accordance with one or more embodiments disclosed herein.

FIGS. 2.1-2.2 show flowcharts in accordance with one or more embodiments described herein.

FIGS. 3.1-3.2 show examples in accordance with one or more embodiments described herein.

FIGS. 4.1-4.3 show flowcharts in accordance with one or more embodiments described herein.

FIGS. 5.1-5.2 show examples in accordance with one or more embodiments described herein.

DETAILED DESCRIPTION

Figure 6:
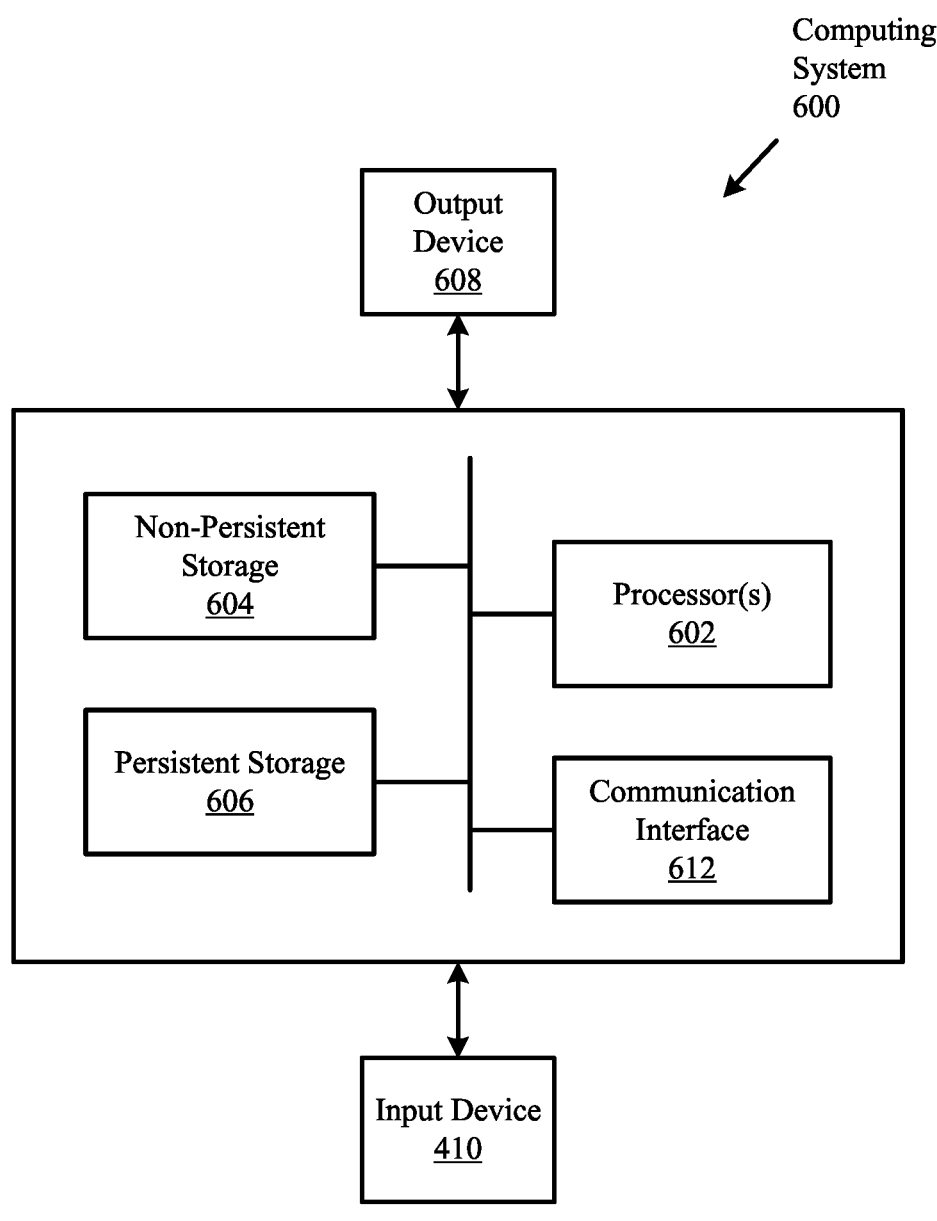
FIG. 6 shows a diagram of a computing device in accordance with one or more embodiments described herein.

Specific embodiments will now be described with reference to the accompanying figures.

Network traffic (e.g., data packets (also referred to herein simply as "packets")) may be dropped from time to time. Although network devices are able to provide counters specifying the number of dropped packets, these network devices are unable to provide context about the content and/or identity of the dropped packets. However, users of a network wish to know more about dropped packets (e.g., whether the dropped packet was critical, part of a large file transfer, why the packets were dropped, etc.). In particular, users wish to obtain first-order knowledge about why the packets were dropped (e.g., dropped as a result of: a link capacity issue, a network device capacity issue, one or more policies set on a network device, a third party during transit through the network, etc.).

One or more embodiments disclosed herein provide the ability to capture dropped packets in order to obtain more information about the dropped packet. In particular, rather than just counting a number of dropped packets, information (e.g., content, identity, etc.) about the dropped packets is stored and provided to a user (e.g., an administrator of the network). This advantageously provides users of a network with (in combination with other information about the network) a better understanding about which packets were dropped and what caused each packet(s) to be dropped.

In particular, in a first example of one or more embodiments, packets (e.g., (i) packets originating from another source that are received and to be forwarded; and/or (ii) packets created by a network device that are to be transmitted by the network device itself, etc.) are captured by the network device dropping the packets. For example, when a network device knows that a packet must be dropped (e.g., due to congestion and/or because of a preset policy such as a quality of service (QoS) policy)), the dropped packet is maintained in a first storage (e.g., non-persistent storage) and subsequently written to a second storage (e.g., persistent storage), or alternatively can be stored directly in persistent storage. Users of the network device will then be able to use this stored information to understand which packets were dropped.

In addition to the dropped packet(s), a predetermined number (e.g., 10-20) of packets forwarded before the dropped packet(s) and after the dropped packet(s) are also recorded along with the dropped packet(s). Alternatively, instead of recording an entirety of the dropped packet(s) (and the preceding and trailing packets), only a header of the dropped packet(s) (and the preceding and trailing packets) is captured and recorded. Once the header(s) are recorded, the remainder of the dropped packet(s) (and the preceding and trailing packets) is truncated and discarded. In one or more embodiments, the number of preceding and trailing packets to be recorded may be dynamically adjusted by a user (e.g., an administrator) of the network device.

Additionally, in one or more embodiments, the dropping of a packet may trigger a start of a packet loss event. More specifically, when a packet drop is detected, a moving window timer and a global timer are started. The moving timer may be restarted each time another packet drop is detected before the moving timer ends. The packet loss event ends when either the moving timer expires or when the global timer expires, whichever occurs first. All of the packets (or just the headers of the packets) within the packet loss event are aggregated as a packet loss event data and stored into either one of the first storage or the second storage. The packet loss event data may also be expanded to include a predetermined number of packets (or just the headers of the packet) preceding the first dropped packet that initiated the packet loss event and a predetermined number of packets (or just the headers of the packet) trailing a packet marked by an end of the packet loss event.

Additional implementation details of the first example of one or more embodiments are described below in reference to FIGS. 2.1-3.2.

Turning now to a second example of one or more embodiments, packet loss may be communicated back from a receiver to a sender of the packet. In particular, the network device transmitting the packet (i.e., the sender) (also referred to herein as "transmitting network device") appends a sequence number to a header (e.g., a VXLAN INT header, an internet protocol security (IPSEC) header, a transmission control protocol header, etc.) of each outgoing packet. This allows the receiving network device (e.g., a network device receiving the packet) to track which packets were dropped while the packets were traversing through the network and convey this information back to the transmitting network device. The transmitting network device further maintains a first storage (e.g., non-persistent storage) and temporarily stores a copy of each packet that was transmitted. When the receiving network device notifies the transmitting network device of the dropped packet using the sequence number(s) (i.e., the sequence number of the dropped packet), the transmitting network device is able to retrieve the dropped packet(s) from the first storage using the sequence number(s) and then subsequently store the retrieved dropped packet(s) in a second storage (e.g., persistent storage). The information stored in the second storage may then be used by users of the network to perform analytics on the dropped packet(s).

For example, assume that a transmitting network device transmits fifty (50) packets to a receiving network device. The first transmitted packet is marked with a sequence number of one (1) and the last transmitted packet is marked with the sequence number fifty (50). Upon transmission, a copy of each transmitted packet is generated and temporarily stored in a first storage. The receiving network device receives the transmitted packets and determines that packets thirty-five (35) through forty (40) were not received (i.e., dropped somewhere in the network). The receiving network device then notifies the transmitting network device that packets 35 through 40 were not received. In response, the transmitting network device parses the first storage to retrieve packets 35 through 40 and stores these packets into the second storage. Users associated with the transmitting network device will then be able to advantageously use this stored information to understand that packets 35 through 40 were not successfully delivered, and perform troubleshooting to determine the cause of the failed delivery (e.g., the cause of packets 35 through 40 being dropped while traversing through the network). In one or more embodiments, the dropped packets may be re-transmitted (e.g., dependent on a transmission protocol configured in the network device, based on instructions received from the user, etc.) by the transmitting network device to the receiving network device.

Using this information from the receiving network device, the transmitting network device may advantageously know which packets within the sequence of fifty failed to reach the receiving network device. Aggregating this information as time series data can allow the transmitting network device to determine a root cause of the packet drops within the network. For example, using the time series data, a user of the transmitting network device may notice that all packets over a certain size (e.g., 500 Mbs) were not received by the receiving network device. This may indicate to the user that a service provider of the network may have installed a network policer that stops (i.e., drops) transmission of all packets over that certain size.

Additional implementation details of the second example of one of more embodiments are discussed below in reference to FIGS. 4.1-5.2.

The various embodiments of the disclosure discussed above are described in more detail below.

FIG. 1.1 shows a system (100) in accordance with one or more embodiments of the disclosure. The system (100) includes one or more network devices (103A, 103N) that are connected via a network (101). Each of these components is described below.

In one or more embodiments disclosed herein, the network (101) may be the medium through which the network devices (103A, 103N) are operatively connected. In one embodiment of the disclosure, the network may include other network devices (or systems) (not shown) that facilitate communication between the aforementioned components. As such, in one embodiment of the disclosure, the network may include any combination of local and/or wide area (e.g., Internet) network segments that may be wire-based and/or wireless and that may use any combination of wired and/or wireless communication protocols.

Additionally, in one or more embodiments, a network (e.g., network (101)) may refer to an entire network or any portion thereof (e.g., a logical portion of the devices within a topology of devices). For example, the network (101) may include a datacenter network, a wide area network, a local area network, a wireless network, a cellular phone network, or any other suitable network that facilitates the exchange of information from one part of the network to another. In one or more embodiments, the network (101) may be coupled with or overlap, at least in part, with the Internet.

In one or more embodiments disclosed herein, the one or more network devices (103A, 103N) are physical devices (e.g., the computing system of FIG. 6) that include persistent storage, memory (e.g., random access memory), one or more processor(s) (including a switch chip), and two or more physical ports. Examples of the network devices (103A, 103N) include, but are not limited to, a router, a switch, a top of rack (TOR) switch, and a multilayer switch. In one or more embodiments, the network devices (103A, 103N) may be directly (or indirectly), connected, via the network, to one another.

In one or more embodiments, the switch chip is hardware that determines which egress port on a network device (103A, 103N) to forward packets (which may be in the form of media access control (MAC) frames). The switch chip may include egress and ingress ports that may connect to ports on the network device (103A, 103N). Each port may or may not be connected to another device (e.g., a server, a switch, a router, etc.). The network device (103A, 103N) may be configured to receive the packets via the ports.

Additionally, the persistent storage in the network devices (103A, 103N) may include any type of non-transitory computer readable medium that stores data. For example, the data in the persistent storage may be instructions, which, when executed by one or more processor(s) in the network device (103A, 103N), enable the network device (103A, 103N) to perform all or a portion of the functions described in accordance with one or more embodiments of the disclosure (see e.g., FIGS. 2 through 5).

Additional details about the network devices (103A, 103N) are now described below with respect to FIG. 1.2.

In particular, turning now to FIG. 1.2, FIG. 1.2 shows a network device (120) in accordance with one or more embodiments of the disclosure. The network device (120) may be the same as any one of the network devices (103A, 103N) described above in FIG. 1.1. In addition to the components discussed above in reference to FIG. 1.1, the network device (120) further includes: one or more network device agents (122), one or more network device interfaces (124), a temporary packet storage (126), and a permanent packet storage (128). Each of the components illustrated in FIG. 1.2 is described below.

In one or more embodiments disclosed herein, the network device agent(s) (122) interacts with the other components of the network device (120). Each network device agent (122) facilitates the implementation of one or more protocols, services, and/or features of the network device (120). Examples of network device agents (120), include, but are not limited to, a bug-alerts agent, a policy agent that manages access control lists, a user interface agent, a routing information base agent, a forwarding information base agent, and a simple network management protocol (SNMP) agent. In one or more embodiments, one or more of the network device agents (122) may interact with the other components of the network device (120) to perform all or a portion of the functions described in accordance with one or more embodiments of the disclosure (see e.g., FIGS. 2 through 5).

In one or more embodiments disclosed herein, the one or more network device interfaces (124) may be physical ports (or a virtual instance thereof) that are connected to other network devices on the network. For example, the network device interfaces (124) may be the ingress and egress ports of the network device (120) where information (e.g., packets) is being received from and/or transmitted to other network devices on the network. In one or more embodiments, the network device interfaces (124) may also include buffers (e.g., non-persistent storage) such as receive/transmit buffers (e.g., rx/tx buffers) associated with one or more of the ingress and egress ports of the network device (120).

In one or more embodiments disclosed herein, each of the temporary packet storage (126) and the permanent packet storage (128) is implemented using devices that provide data storage services (e.g., storing data and providing copies of previously stored data). For example, each of the temporary packet storage (126) and the permanent packet storage (128) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage). In one or more embodiments disclosed herein, the temporary packet storage (126) and the permanent packet storage (128) are configured to store dropped packets.

One skilled in the art will recognize that the architecture of the system (100) and of the network device (120) is not limited to the components shown in FIGS. 1.1 and 1.2. For example, the network (101) may include any number and any type of network devices participating in the sharing of data. Further, the network device (120) may include components (e.g., a processor, a transceiver, etc.) not shown in FIG. 1.2.

FIGS. 2.1-2.2 show flowcharts of a method in accordance with the first example of one or more embodiments of the disclosure. The method depicted in FIGS. 2.1-2.2 may be performed to record dropped packets. The method shown in FIGS. 2.1-2.2 may be performed by, for example, a same network device (e.g., 120, FIG. 1.2) that is transmitting and/or receiving a packet. Additionally, while FIGS. 2.1-2.2 are illustrated as a series of steps, any of the steps may be omitted, performed in a different order, additional steps may be included, and/or any or all of the steps may be performed in a parallel and/or partially overlapping manner without departing from the disclosure.

Initially, in Step 200, the network device determines that a packet (e.g., (i) a packet being received that originated from another source; and/or (ii) a packet that is to be transmitted and is created by the network device and/or a packet from another source that is to be re-transmitted, etc.) is to be dropped.

In one or more embodiments, the network device may determine (e.g., using a tail drop application) that a packet is to be dropped because there is a link congestion at the network device interface(s) (e.g., 124, FIG. 1.2). For example, a transmit buffer (tx buffer) of the network device storing packets to be transmitted may become full (i.e., congested). More specifically, assume there is a network device (e.g., a wireless area network (WAN) router) with a low to moderate speed uplink of, for example, 100 Mb/s up through 1 Gbps. As packets going towards the WAN/Internet uplink increases, the tx buffer of the network device fills up and becomes full, which requires queued packets that have not made it into the full tx buffer and/or certain packets already within the full tx buffer to be dropped.

In one or more embodiments, the dropping of a packet may also be based on one or more quality of service (QoS) policies and/or access control lists stored in the network device (120). Additionally, more than one packet may be determined by the network device as packets that are to be dropped.

In one or more embodiments, the determination in Step 200 that a packet is to be dropped may trigger a packet loss event. Once a packet loss event is triggered, the network device may further (in Step 200) compile packet loss event data for recording the packet loss event. For example, the packet loss event may be a method of event dampening and bundling to concatenate information about the packet loss (i.e., packet drops) within a given period into a single event for notification and analysis purposes.

To better understand the details of the packet loss event, we now turn to Step 220 of FIG. 2.2. In Step 220, at the start of the packet loss event, the network device detects that a packet is to be dropped from a buffer (e.g., the rx/tx buffers discussed above).

In Step 222, in response to detecting that a packet is to be dropped in Step 220, the network device starts a moving window timer (MWT) and a global timer. In one or more embodiments, the duration of each of the moving window timer and the global timer may be of any value and may be set (at any time) by a user. The ending of the moving window timer or the global timer, whichever occurs first, marks an end of the packet loss event. Said another way, the start of the moving window timer marks the beginning of a packet loss event and the end of the moving window timer marks the end of the packet loss event. The moving window timer may be restarted if another packet drop is detected while the moving window timer is active. The moving window timer may be continuously restarted until either (1) no more packet drops are detected while the moving window timer is active or (2) a global timer that is started simultaneously with the first instance of the moving timer (before any restarts) has ended before a current active instance of the moving window timer has ended. If the moving window timer ends (i.e., expires) before the global timer, the global timer will also end. In one or more embodiments, the moving window timer may be shorter than the global timer (e.g., the global timer may be a multiple of the moving window timer).

After starting the moving window timer and the global timer, the network device determines (in Step 224) whether the global timer has elapsed. If the global timer has elapsed (i.e., YES in Step 224), the network device determines that the packet loss event has ended and samples (in Step 225) a content of the buffer based on a start and an end of the global timer to generate the packet loss event data.

For example, in one or more embodiments, all packets (whether dropped or not dropped) between the start of the global timer and the end of the global timer are recorded as part of the packet loss event data. Alternatively, only the packets dropped within the duration of the global timer are recorded. Additionally, in addition to the packets (dropped or un-dropped) within the duration of the global timer, the network device may also record as the part of the packet loss event data (through sampling the buffer): (i) a number of packets that were forwarded (i.e., transmitted) immediately before the first dropped packet marking the start of the packet loss event (herein referred to as "preceding packets"); and (ii) a number of packets (herein referred to as "trailing packets") immediately following (i.e., after) a packet within the buffer that is marked by the end of the packet loss event. In one or more embodiments, any number of preceding packets immediately preceding the dropped packet(s) and trailing packets immediately trailing the dropped packet(s) may be recorded as part of the packet loss event data.

As one example, in one or more embodiments, ten (10) preceding packets and ten (10) trailing packets may be recorded as part of the packet loss event data. Although ten (10) is used as an example above, one of ordinary skill in the art would appreciate that the number of trailing packets and preceding packets to be dropped is not limited to ten (10), and any number of trailing packets and preceding packets may be dropped without departing from the scope of one or more embodiments disclosed herein. The number of recorded preceding packets and trailing packets may be set in any way (e.g., by a user of the network device, by a system administrator of the network, by one or more determinations made by the network device, etc.) without departing from the scope of one or more embodiments disclosed herein.

In one or more embodiments, instead of storing an entirety of the dropped packet(s) (i.e., all of the data making up the dropped packet(s)) as the packet loss event data, the network device may store only a packet header of the dropped packet(s). The remainder of the dropped packet(s) (i.e., everything aside from the packet header) is truncated and discarded (i.e., deleted). Similarly, only the packet headers of the preceding packets and trailing packets are recorded by the network device as part of the packet loss event data.

In one or more embodiments, the network device may also store additional data as part of the packet loss event data. These additional data may provide enrichment and contextualization for the packet drop event and may include, but are not limited to: class of service (COS) associated with packets recorded as part of the packet loss event data; timestamp of drop of each dropped packet; application identifier (App ID) of an application directed to each of the packets; rx/tx buffer utilization at time each packet(s) was drop; link utilization at time of a drop (e.g., last 5-10 s/1 m rolling average); etc.

Turning back now to FIG. 2.2, if the network device determines that the global timer has not elapsed (i.e., NO in Step 224), the network device determines (in Step 226) whether the moving timer has elapsed. If the network device determines that the global timer has not elapsed but the moving timer has elapsed (i.e., YES in Step 226), the process proceeds to Step 225 (as discussed above). More specifically, in this instance where the global timer has not yet elapsed but the moving timer has elapsed, the sampling of the buffer content (in Step 225) will be based on a start and end time of the moving timer instead of the global timer. In one or more embodiments, if a second packet loss occurs after a first instance of the moving window timer ends, the second packet loss will trigger a second packet loss event and the lost packet will be captured as part of the second packet loss event.

Conversely, in Step 226, if the network device determines that neither the global timer nor the moving timer has elapsed (i.e., NO in Step 226), the network device determines whether another packet drop is detected. If another packet drop is detected before either the of the two timers (the moving window timer and the global timer) expires (i.e., YES in Step 228), the network device restarts the moving window timer in Step 230, the process returns to Step 224, and the process continues until an end of the packet loss event is detected as a result of either the global timer or the moving window timer expiring.

Conversely, in Step 228, if the network device does not detect another packet drop (i.e., NO in Step 228), the process returns to Step 224 and continues until an end of the packet loss event is detected as a result of either the global timer or the moving window timer expiring.

The above-discussed checking of the timers (i.e., determination of a start and end of the packet loss event) and the sampling of the buffer are shown in more detail below in reference to FIG. 3.2.

Turning back now to FIG. 2.1, in Step 202 of FIG. 2.1, in response to detecting the packet loss event and compiling the packet loss event data in Step 202, the network device temporarily stores the packet loss event data in a first storage. In one or more embodiments, the temporary storing of the packet loss event data may be executed after the dropped packet(s) have been removed from the rx/tx buffer. Alternatively, the temporary storing of the packet loss event data may be executed before the dropped packet(s) are removed from the rx/tx buffer (i.e., before the packets are actually dropped). For example, the network device may execute a write-out of the dropped packet(s) (as the packet loss event data) from the rx/tx buffer to the first storage. In one or more embodiments, the first storage may be non-persistent storage (e.g., 126, FIG. 1.2).

In Step 204, after the packet loss event data has been temporarily stored in the first storage for an amount of time, the network device initiates a transfer of the packet loss event data from the first storage to a second storage. In one or more embodiments, the second storage may be persistent storage (e.g., 128, FIG. 1.2). In one or more embodiments, all data associated with the packet loss event data in the first storage may be deleted from the first storage after the packet loss event data is transferred to the second storage.

In Step 206, once the packet loss event data is transferred to the second storage, the network device may display a notification (to a user of the network device) that the packet loss event data has been added to the second storage. This advantageously allows the user of the network device to analyze the information stored in the packet loss event data to determine one or more causes resulting in the packet drop event.

To further clarify embodiments of the disclosure, implementation examples of one or more embodiments are provided in FIGS. 3.1 and 3.2. Specifically, FIGS. 3.1-3.2 show examples of the method discussed above in reference to FIGS. 2.1-2.2, respectively. The numbers in the brackets below, e.g., "[1]", correspond to the same circled numbers in FIG. 3.1.

Start of Examples

As shown in FIG. 3.1, initially, a packet is received at (or is being transmitted using) a network device interface (324) (e.g., 124, FIG. 1.2) of a network device (320) (e.g., 103A-103N, FIG. 1.1; 120, FIG. 1.2) [1]. The network device (320) determines that the packet is to be dropped [2]. After determining that the packet is to be dropped, the network device (320) initiates a packet loss event (e.g., see details in below FIG. 3.2), compiles packet loss event data for the packet loss event, and temporarily stores a copy of the packet loss event data in a temporary packet storage (326) (e.g., 126, FIG. 1.2) [3]. The network device (320) subsequently transfers the packet loss event data from the temporary packet storage (326) to a permanent packet storage (328) (e.g., 128, FIG. 1.2) [4]. Finally, the network device (320) notifies a user that packet loss event data has been stored in the permanent packet storage (328) [5].

Turning now to FIG. 3.2, FIG. 3.2 shows an example buffer (360) (e.g., a tx buffer or an rx buffer). The buffer may have an incoming flow of (received or to be transmitted) packets. As shown in FIG. 3.2, a first packet drop (Drop 1) in the buffer starts a packet loss event. At the start of the packet loss event, a first instance of a moving window timer (MWT$_A$) and a global timer is started.

As shown in FIG. 3.2, before the first instance of moving window timer (MWT$_A$) expires, a second packet drop (Drop 2) is detected. Because this second packet drop (Drop 2) occurred before the global timer expired, the first instance of the moving window timer (MWT$_A$) is extended to become a second instance of the moving window timer (MWT$_B$). This second instance of the moving window timer (MWT$_B$) is further extended as a third instance of the moving timer (MWT$_C$) upon detection of a third packet drop (Drop 3) that occurred before the global timer expired. Finally, prior to the third instance of the moving timer (MWT$_C$) expiring, the global timer expires and the end of the packet loss event is recorded at the expiration of the global timer.

Once the start and the end of the packet loss event are recorded, the network device containing the buffer samples an area (e.g., sampled area for packet loss event data) of the buffer based on the start and end of the packet loss event. In the example shown in FIG. 3.2, the sampled area includes the sampling of one or more preceding and trailing packets. All data within the sampled area for packet loss event data is then aggregated into the packet loss event data to be exported and stored in storage.

Although the example of FIG. 3.2 shows multiple instances of the moving window timer (MWT), one of ordinary skill in the art would appreciate that there may be only a single instance of the moving timer that may be continuously extended rather than multiple instances, and that the multiple instances in FIG. 3.2 are only shown for illustration purposes.

End of Examples

Now that the first example of one or more embodiments has been described, the second example of one or more embodiments (see above paragraphs [0017]-[0020]) will now be described below in reference to FIGS. 4.1-5.2.

FIGS. 4.1 and 4.2 show a flowchart of a method in accordance with one or more embodiments of the disclosure. The method depicted in FIGS. 4.1 and 4.2 may be performed to record dropped packets. The method shown in FIGS. 4.1 and 4.2 may be performed by, for example, a network device (e.g., 120, FIG. 1.2) (namely, by a transmitting network device of a transmitting/receiving device pair). Additionally, while FIGS. 4.1 and 4.2 are illustrated as a series of steps, any of the steps may be omitted, performed in a different order, additional steps may be included, and/or any or all of the steps may be performed in a parallel and/or partially overlapping manner without departing from the disclosure.

In Step 400, a network device (e.g., a transmitting network device) initiates transmission of a first packet and a second packet to another network device (e.g., a receiving network device). In one or more embodiments, any number of packets may be transmitted by the transmitting network device to the receiving network device.

In Step 402, in response to initiating the transmission, the transmitting network device attaches a first identifier (ID) to a header of the first packet and a second ID to a header of the second packet. In one or more embodiments, the second ID is different from the first ID. Each of the first ID and the second ID may be a unique string or characters or numbers that can be used to uniquely identify each of the first packet and the second packet. For example, the first ID and the second ID may each be a number (e.g., a sequence number) reflecting a sequence in which the first packet and the second packet is transmitted. In one or more embodiments, the first ID and the second ID may be part of in-band network telemetry (INT) information included in the header of the first packet and the header of the second packet.

In Step 404, the transmitting network device generates a copy of the first packet including the first ID and a copy of the second packet including the second ID, and (in Step 406) temporarily store the copy of the first packet and the copy of the second packet in a first storage. In one or more embodiments, the transmitting network device may generate the copies of the first packet and the second packet at any time after the first and second IDs have been added to the first and second packets, respectively, and before the first and second packets have actually been transmitted. In one or more embodiments, the first storage may be non-persistent storage (e.g., 126. FIG. 1.2).

In one or more embodiments, the copy of the first packet including the first

ID and the copy of the second packet including the second ID may be temporarily stored in the first storage (e.g., a trailing ring buffer) for a predetermined amount of time. The predetermined amount of time may be any amount of time set by a user. For example, the predetermined amount of time may be, but is not limited to, between two to four times a round-trip-time (RTT) of a path (within the network) between the transmitting network device and the receiving network device.

In Step 408, in response to temporarily storing the first packet and the second packet in the first storage, the transmitting network device transmits the first packet and the second packet to the receiving network device. More specifically, the transmitting network device may transmit the first packet and the second packet through a network device interface (e.g., 124, FIG. 1.2; from a tx buffer) of the transmitting network device to a network device interface (e.g., 124, FIG. 1.2; to a rx buffer) of the receiving network device. In one or more embodiments, the transmitting network device may transmit the first and second packets after determining that storing of the first and second packets in the first storage has been completed.

Turning now to FIG. 4.2, in Step 410, after the first and second packets have been transmitted to the receiving network device, the transmitting network device receives (from the receiving network device) a notification that one of the first packet or the second packet was not received. In one or more embodiments, the notification from the receiving network device may include either or both of the first ID and the second ID. In the example discussed in FIGS. 4.1 and 4.2 where only one of the first packet and the second packet is lost during a transmission of the packets, the notification from the receiving network device includes the first ID. This indicates that the receiving network device has not received the first packet. Details with regard to how the receiving network device generates the notifications to be transmitted to the transmitting network device are discussed below in reference to FIG. 4.3

Continuing with the above example, in one or more embodiments, prior to Step 410, the receiving network device may receive only the second packet. The receiving network device may parse the second packet and identify the second ID. Using the second ID, the receiving network device may determine that a first packet was also supposed to be transmitted to the receiving network device, and that the two packets (the first and second packets) were to be received within a given time frame. For example, when the second ID is a sequence number, the receiving network device will know from receiving a packet with the sequence number two (2) that another packet with the sequence number one (1) should also have been transmitted to the receiving network device. In one or more embodiments, in response to determining that a packet intended to be transmitted to the receiving network device was not received, the receiving network device generates the notification including the ID of the packet that was not received and transmits the notification to the transmitting network device. In one or more embodiments, the notification may also include one or more IDs of packets with sequence numbers prior to and/or after the sequence number of the packet that was not received.

Although the above example has been described with respect to two (2) packets being transmitted from the transmitting network device, one of ordinary skill in the art would appreciate that any number of packets may be transmitted by the transmitting network device and that these transmitted packets may be received in any sequence (i.e., order) by the receiving network device without departing from the scope of one or more embodiments disclosed herein.

In Step 412, the transmitting network device uses the first ID in the notification from the receiving device to obtain the copy of the first packet from the first storage. For example, in one or more embodiments, the transmitting network device may parse the first storage to determine if any packets in the first storage include an ID that matches the first ID.

In Step 414, in response to obtaining the copy of the first packet from the first storage, the transmitting network device initiates a transfer of the copy of the first packet from the first storage to a second storage. In one or more embodiments, the second storage may be persistent storage (e.g., 128, FIG. 1.2). In one or more embodiments, all data associated with the copy of the first packet may be deleted from the first storage after the copy of the first packet is transferred to the second storage. In one or more embodiments, the first packet that was dropped may be re-transmitted (e.g., dependent on a transmission protocol configured in the network device, based on instructions received from the user, etc.) by the transmitting network device to the receiving network device.

In one or more embodiments, instead of transferring an entirety of the copy of the first packet, the transmitting network device may transfer only a packet header of the first packet to the second storage. Upon transferring the packet header of the first packet to the second storage, all data associated with the copy of the first packet may be deleted from the first storage.

In Step 416, the transmitting network device may display (e.g., on a display connected to the transmitting network device) a notification that the first packet was stored into the second storage. This indicates to a user of the transmitting network device that the first packet was not received by the receiving network device. In one or more embodiments, the first packet that was dropped may include content (e.g., a path that the first packet is to be transmitted on, the path statistics, etc.) that may further help the user determine a reason as to why the first packet was dropped while being transmitted through the network.

To further clarify embodiments of the disclosure, examples of one or more embodiments are provided in FIGS. 5.1 and 5.2. Specifically, FIG. 5.1 shows an example of the method discussed above in reference to FIGS. 4.1 and

4.2 while FIG. 5.2 shows an example of the method discussed above in reference to FIG. 4.3.

Turning now to FIG. 4.3, FIG. 4.3 shows a flowchart of a method in accordance with one or more embodiments of the disclosure. The method depicted in FIGS. 4.3 may be performed to record dropped packets. The method shown in FIGS. 4.3 may be performed by, for example, a network device (e.g., 120, FIG. 1.2) (namely, by a receiving network device of a transmitting/receiving device pair). Additionally, while FIGS. 4.3 are illustrated as a series of steps, any of the steps may be omitted, performed in a different order, additional steps may be included, and/or any or all of the steps may be performed in a parallel and/or partially overlapping manner without departing from the disclosure.

Initially, in Step 440, a receiving network device (e.g., the receiving network device discussed above in reference to Step 408 of FIG. 4.1) detects that an identifier (ID) (or a series of IDs) is missing during the reception of a sequence of packets from a transmitting network device. As discussed above in reference to FIGS. 4.1 and 4.2, each packet in the sequence of packets being received is appended (in a header of the packet) with an ID such as, but is not limited to, a sequence number. For example, in the event the sequence of packets are received in numerical order, after receiving a first packet with sequence number "1", the receiving network device receives a packet with a sequence number "4". This notifies the receiving network device that packets "2" and "3" may have been dropped during transit through the network.

In Step 440, in response to detecting that an ID (or a series of IDs) are missing, the receiving network device stores (in Step 442) the detected missing ID(s) in a buffer and starts (in Step 444) a network timer and max network timer.

In one or more embodiments, the duration of each of the network timer and the max network timer may be of any value and may be set (at any time) by a user. The ending of the network timer or the max network timer, whichever occurs first, marks the start of generating a notification to be transmitted to the transmitting network device (i.e., start of a notification generation event) (see below Step 447). Said another way, the start of the network timer starts the gathering of detected missing IDs for the notification to be generated and the end of the network timer marks the start of generating the notification for including all missing IDs detected while the network timer was active. The network timer may be restarted if another missing ID is detected while the network timer is active. The network timer may be continuously restarted until either (1) no more missing IDs are detected while the network timer is active or (2) a max network timer that is started simultaneously with the first instance of the network timer (before any restarts) has ended before a current active instance of the network timer has ended. If the network timer ends (i.e., expires) before the max network, the max network timer will also end.

In one or more embodiments, the network timer may be shorter than the max network timer (e.g., the global timer may be a multiple of the moving window timer). The max network timer may be shorter than the RTT of a path (within the network) between the transmitting network device and the receiving network device. Information of the RTT of the path may be retrieved from a header of any one of the received packets in the sequence of packets.

In Step 446, the receiving network device determines whether the max network timer has elapsed. In the event that the max network timer has elapsed (i.e., YES in Step 446), the receiving network device aggregates all detected missing IDs detected within the duration of the max network timer into a notification and transmits the notification to the transmitting network device to let the transmitting network device know that certain packets among the sequence of packets were not received. In one or more embodiments, if another missing ID is detected after a first instance of the notification generation event has ended, the newly detected missing ID will trigger a second notification generation event and be reported in the notification generated as part of the second notification generation event.

Conversely, if the max network timer has not yet elapsed (i.e., NO in Step 446), the receiving network device determines (in Step 448) whether the network timer has expired. If the receiving network device determines that the network timer has expired before the max network timer expires (i.e., YES in Step 448), the process proceeds to step 447 where the receiving network device aggregates all detected missing IDs detected within the duration of the network timer into a notification and transmits the notification to the transmitting network device.

Conversely, if neither the network timer nor the max network timer have expired (i.e., NO in Step 448), the receiving network device determines (in Step 450) while these two timers are still running (i.e., active) whether another missing ID(s) has been detected.

In one or more embodiments, if another missing ID has been detected while both timers are still active (i.e., YES in Step 450), the receiving network device restarts the network timer and the process returns to Step 446. The process continues until either one of the two timers expires, at which point a notification is generated and transmitted to the transmitting network device (see Step 447). Conversely, if another missing ID was not detected before one of the two timers ran out (i.e., NO in Step 450), the process returns to Step 446 and continues until either one of the two timers expires, at which point a notification is generated and transmitted to the transmitting network device (see Step 447).

A detailed example of the above process described in FIG. 4.3 is discussed below in reference to FIG. 5.2.

Start of Examples

As shown in FIG. 5.1, initially, a transmitting network device (520) (e.g., 103A-103N, FIG. 1.1; 120, FIG. 1.2) determines that a first packet and a second packet are to be transmitted to the receiving network device (540) (e.g., 103A-103N, FIG. 1.1; 120, FIG. 1.2) [1]. The transmitting network device (520) attaches unique IDs to the headers of each of the first packet and the second packet [2]. After attaching the unique IDs, the transmitting network device (520) makes a copy of each of the first packet and the second packet and stores the copies in a temporary packet storage (526) (e.g., 126, FIG. 1.2) [3]. Then, the first packet and the second packet are transmitted to the receiving network device (540) using the network device interface (524) [4].

After the packets have been transmitted by transmitting network device (520), a reception of the packets is made at the network device interface (544) of the receiving network device (540). The receiving network device (540) determines from the reception that the first packet was not received [5] (a more detailed example of this determination is shown below in reference to FIG. 5.2). In response, the receiving network device (540) notifies the transmitting network device (520) that the first packet was not received and provides the unique ID of the first packet in the notification [6].

Subsequently, the transmitting network device (520) receives the notification with the unique ID of the first packet [7]. In response and using the unique ID of the first packet included in the notification, the transmitting network device (520) obtains the copy of the first packet from the temporary packet storage (526) [8]. The transmitting network device (520) subsequently transfers the copy of the first packet from the temporary packet storage (526) to a permanent packet storage (528) (e.g., 128, FIG. 1.2), and notifies a user of the packet loss during the transmission [9].

Turning now to FIG. 5.2, FIG. 5.2 shows a transmitting buffer (tx buffer) (560) with a sequence of packets (562) on a transmitting network device and a receiving buffer (rx buffer) (580) receiving the same sequence of packets (562) on a receiving network device of a transmitting/receiving device pair.

As shown in FIG. 5.2, the packets "2" and "3" (shown using the broken lines) were not received by the receiving network device. Once the receiving network device determines that packets "2" and "3" are missing, the receiving network device stores this information in a buffer and starts a first instance of a network timer (Network Timer$_A$) and a max network timer. While the first instance of the network timer (Network Timer$_A$) is still active, the receiving network device determines that packet "5" is missing and restarts the first instance of the network timer (Network Timer$_A$) as a second instance of the network timer (Network Timer$_B$). This information that packet "5" is missing is stored in a buffer separate from the rx buffer (580).

Again, while the second instance of the network timer (Network Timer$_B$) is still active and before the max network timer expires, the receiving network device determines that packet "9" is missing. The receiving network device restarts the second instance of the network timer (Network Timer$_B$) as a third instance of the network timer (Network Timer$_C$) and stores the information (e.g., the ID "9") about missing packet "9" in a buffer.

Before the receiving network device can detect another missing ID and before the third instance of the network timer (Network Timer$_C$) expires, the receiving network device determines that the max network timer has expired. At this point, the receiving network device aggregates all of the missing IDs stored in the buffer and generates a notification (590) including these missing IDs to be transmitted to the transmitting network device.

End of Examples

As discussed above, embodiments disclosed herein may be implemented using computing devices. FIG. 6 shows a diagram of a computing device in accordance with one or more embodiments disclosed herein. Computing device (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), communication interface (612) (e.g., Bluetooth interface, infrared interface, network interface, optical interface, etc.), input devices (610), output devices (608), and numerous other elements (not shown) and functionalities. Each of these components is described below.

In one embodiment disclosed herein, computer processor(s) (602) may be an integrated circuit for processing instructions. For example, the computer processor(s) may be one or more cores or micro-cores of a processor. Computing device (600) may also include one or more input devices (610), such as a touchscreen, keyboard, mouse, microphone, touchpad, electronic pen, or any other type of input device. Further, communication interface (612) may include an integrated circuit for connecting computing device (600) to a network (not shown) (e.g., a local area network (LAN), a wide area network (WAN) such as the Internet, mobile network, or any other type of network) and/or to another device, such as another computing device.

In one embodiment disclosed herein, computing device (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to computer processor(s) (602), non-persistent storage (604), and persistent storage (606). Many different types of computing devices exist, and the aforementioned input and output device(s) may take other forms.

As shown above, specific embodiments have been described with reference to the accompanying figures. In the above description, numerous details are set forth as examples. It will be understood by those skilled in the art, and having the benefit of this Detailed Description, that one or more embodiments described herein may be practiced without these specific details and that numerous variations or modifications may be possible without departing from the scope of the embodiments. Certain details known to those of ordinary skill in the art may be omitted to avoid obscuring the description.

In the above description of the figures, any component described with regard to a figure, in various embodiments, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the term connected, or connection, means that there exists between elements/components/devices a direct or indirect connection that allows the elements to interact with one another in some way. For example, the term 'connected' may refer to any direct (e.g., wired directly between two devices or components) or indirect (e.g., wired and/or wireless connections between any number of devices or components connecting the connected devices) connection. Thus, any path through which information may travel may be considered a connection.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for recording network traffic loss across a network, the method being executed by a network device within the network and comprising:

initiating transmission of a first packet and second packet;

in response to initiating the transmission, initializing the first packet and the second packet for the transmission, wherein the initializing of the first packet and the second packet for the transmission comprises:

attaching a first identifier (ID) to a header of the first packet and a second identifier (ID) to a header of the second packet, wherein the second ID is different from the first ID;

generating a copy of the first packet including the first ID and a copy of the second packet including the second ID; and storing the copy of the first packet and the copy of the second packet in a first storage;

transmitting, after initializing the first packet and the second packet, the first packet and the second packet to a receiving network device connected to the transmitting network device via the network;

receiving, after the transmitting, a first notification from the receiving network device that one of the first packet or the second packet was not received, wherein the first notification comprises one or more identifiers of packets not received by the receiving network device between a start of both a global network timer and a moving window timer at the receiving network device and an expiration of either the global network timer or the moving window timer, wherein the moving window timer is shorter than the global network timer, the global network timer and the moving window timer were both started based on a determination that one or more packets were not received at the receiving network device, and the moving window timer is restarted based on determination of another packet drop within the moving window timer; and displaying, to a user of the transmitting network device and using the first notification, a second notification to the user that the one of the first packet or the second packet was not received by the receiving network device.

2. The method of claim 1, wherein the copy of the first packet and the copy of the second packet are stored in the first storage for an amount of time, and the amount of time is between two to four times a round-trip-time (RTT) of a path between the transmitting network device and the receiving network device used for transmitting the first packet and the second packet.

3. The method of claim 2, wherein displaying the second notification comprises:

obtaining, using the first ID in the notification, the copy of the first packet from the first storage and transferring the copy of the first packet to a second storage; and displaying, in response to the transferring, the second notification to the user, wherein the second notification indicates that the first packet was not received by the receiving network device.

4. The method of claim 3, wherein the first storage is non-persistent storage and the second storage is persistent storage, and the first ID and the second ID are both sequential sequence numbers.

5. The method of claim 1, wherein the one of the first packet or the second packet that was not received by the receiving network device is displayed with path statistics of a path between the transmitting network device and the receiving network device used for transmitting the first packet and the second packet.

6. The method of claim 1, wherein the header of the first packet and the header of the second packet comprise in-band network telemetry (INT) information.

7. The method of claim 1, wherein the second notification comprises event data associated with the first packet or the second packet.

8. The method of claim 7, wherein the event data comprises class of service (COS) data or an application ID of an application associated with the first packet or second packet.

9. A network device, comprising:
a processor;
data storage; and
a non-transitory computer readable medium, comprising instructions for:
obtaining a first packet and a second packet;
attaching a first identifier (ID) to a header of the first packet and a second identifier (ID) to a header of the second packet, wherein the second ID is different from the first ID;
generating a copy of the first packet including the first ID and a copy of the second packet including the second ID;
storing the copy of the first packet and the copy of the second packet in the data storage;
transmitting the first packet and the second packet to a receiving network device;
receiving, after the transmitting, a first notification from the receiving network device that one of the first packet or the second packet was not received, wherein the first notification comprises one or more identifiers of packets not received by the receiving network device between a start of both a global network timer and a moving window timer at the receiving network device and an expiration of either the global network timer or the moving window timer, wherein the moving window timer is shorter than the global network timer, the global network timer and the moving window timer were both started based on a determination that one or more packets were not received at the receiving network device, and the moving window timer is restarted based on determination of another packet drop within the moving window timer; and
based on the first notification, displaying to a user a second notification that the one of the first packet or the second packet was not received by the receiving network device.

10. The system of claim 9, wherein the copy of the first packet and
the copy of the second packet are stored in the first storage for an amount of time associated with
a round-trip-time (RTT) of a path to the receiving network device.

11. The system of claim 10, wherein the data storage is temporary storage.

12. The system of claim 10, wherein a first identifier in the first notification is used to obtain the one of the first packet or second packet togenerate the second identification.

13. The system of claim 10, wherein the second notification comprises path statistics of a path associated with the receiving network device.

14. The system of claim 10, wherein a header of the first packet and a header of the second packet comprise in-band network telemetry (INT) information.

15. A non-transitory computer readable medium, comprising instructions for:
receiving a first notification that at least one of a first packet or a second packet was not received at a receiving network device, wherein the first notification comprises one or more identifiers of packets not received by the receiving network device between a start of both a global network timer and a moving window timer at the receiving network device and an expiration of either the global network timer or the moving window timer, wherein the moving window timer is shorter than the global network timer, the global network timer and the moving window timer were both started based on a determination that one or more packets were not received at the receiving network device, and the moving window timer is restarted based on determination of another packet drop within the moving window timer, and wherein:
a first identifier (ID) was attached to a header of the first packet and a second identifier (ID) was attached to a header of the second packet, where the second ID is different from the first ID;
a copy of the first packet including the first ID was generated;
a copy of the second packet including the second ID was generated;
the copy of the first packet and the copy of the second packet were stored in data storage; and
the first packet and the second packet were transmitted to the receiving network device; and
based on the first notification, displaying to a user a second notification that at least one of the first packet or the second packet was not received by the receiving network device.

16. The non-transitory computer readable medium of claim 15,
wherein the first notification is associated with a tail drop application.

17. The non-transitory computer readable medium of claim 15,
wherein the first ID and the second ID are associated with an order of transmission of the first packet and the second packet.

18. The non-transitory computer readable medium of claim 17,
wherein the first notification includes the first ID or the second ID.

19. The non-transitory computer readable medium of claim 18,
wherein the first ID or second ID in the first notification is used to obtain the at least one of the first packet or second packet to generate the second identification.

20. The non-transitory computer readable medium of claim 19, wherein the second notification identifies the at least one of the first packet or second packet that was not received.

* * * * *